United States Patent [19]

Hodkinson

[11] Patent Number: 4,653,615
[45] Date of Patent: Mar. 31, 1987

[54] AUTOMATIC WEAR ADJUSTER FOR DRUM BRAKES

[75] Inventor: Harold Hodkinson, Coventry, England

[73] Assignee: Automotive Products Limited, Leamington Spa, England

[21] Appl. No.: 302,532

[22] Filed: Sep. 16, 1981

[30] Foreign Application Priority Data

Oct. 2, 1980 [GB] United Kingdom ............... 8031865

[51] Int. Cl.[4] ............................................. F16D 65/52
[52] U.S. Cl. ....................... 188/79.5 P; 188/196 BA; 188/196 V; 192/111 A
[58] Field of Search ........ 188/196 V, 196 BA, 196 R, 188/79.5 GC, 79.5 P, 79.5 GE, 79.5 GT; 192/111 A

[56] References Cited

U.S. PATENT DOCUMENTS

| | | | |
|---|---|---|---|
| 1,875,391 | 9/1932 | Parker | 188/79.5 P X |
| 4,039,055 | 8/1977 | Meyer et al. | 188/196 BA X |
| 4,071,123 | 1/1978 | Courbot et al. | 188/79.5 P X |
| 4,222,467 | 9/1980 | Kluger et al. | 188/79.5 GE |
| 4,232,766 | 11/1980 | Rupprecht | 188/79.5 P |
| 4,236,611 | 12/1980 | Claverie | 188/79.5 P |
| 4,375,251 | 3/1983 | Burke et al. | 188/196 BA X |

FOREIGN PATENT DOCUMENTS

| | | | |
|---|---|---|---|
| 2846473 | 5/1980 | Fed. Rep. of Germany | 188/79.5 GE |
| 1400415 | 7/1975 | United Kingdom | 188/79.5 GE |
| 1509125 | 4/1978 | United Kingdom . | |
| 1571359 | 7/1980 | United Kingdom . | |

Primary Examiner—George E. A. Halvosa
Attorney, Agent, or Firm—Solon B. Kemon

[57] ABSTRACT

A wear adjuster for an internal shoe drum brake of the kind having a strut extending between one shoe and a handbrake lever pivoted on the other shoe includes a spacer between the strut and the one shoe, a screwing mechanism for adjusting the spacing effect of the spacer having an actuating mechanism responsive to service operation of the brake. The brake shoe pull-off spring serves also as a biassing spring for the actuating mechanism.

2 Claims, 5 Drawing Figures

U.S. Patent      Mar. 31, 1987      4,653,615
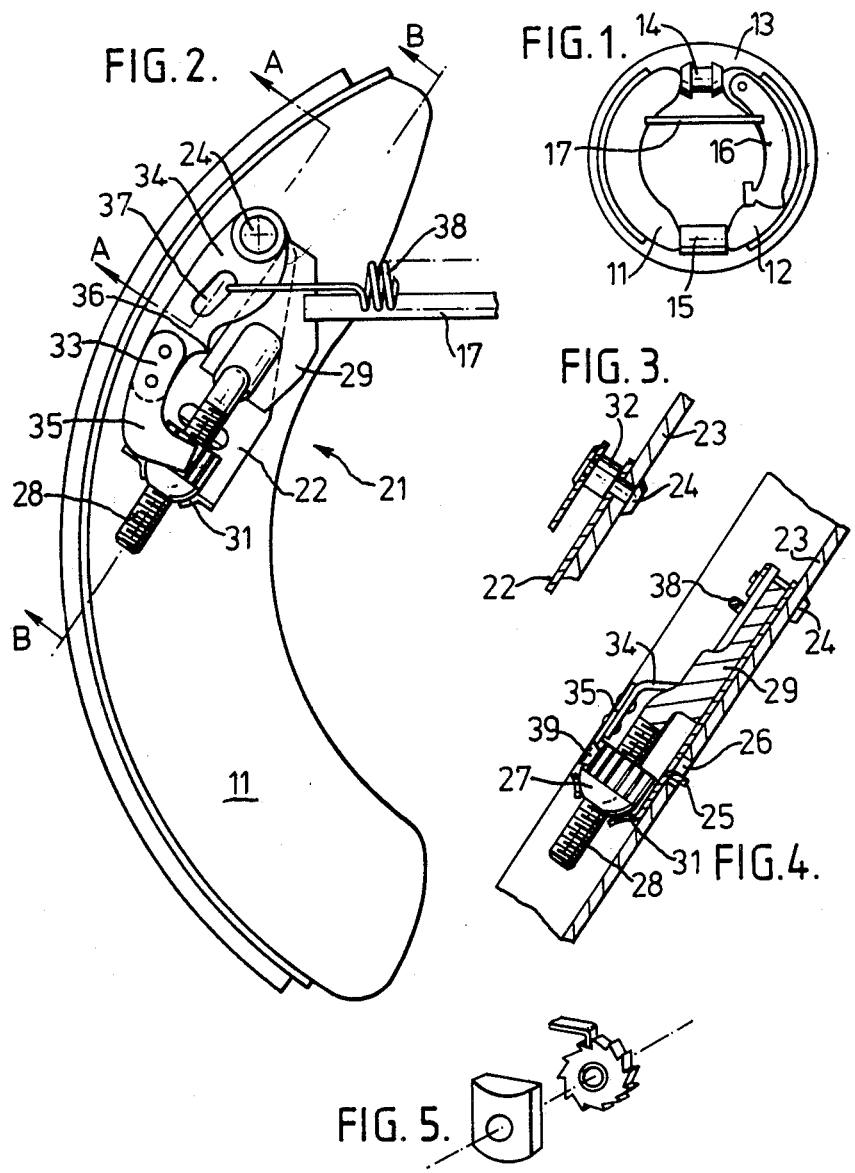

AUTOMATIC WEAR ADJUSTER FOR DRUM BRAKES

This invention relates to automatic wear adjusters for drum brakes and is particularly applicable to the wheel brakes of motor vehicles.

A drum brake normally includes a fixed back plate, a pair of arcuate brake shoes mounted on the back plate, expanding means for urging the brake shoes apart generally radially of the back plate, return spring means and a rotatable brake drum, co-axial with the back plate, and against which the brake shoes act.

Such a brake may have independent service brake and parking brake expanding means. By service brake we mean the primary vehicle braking system, usually hydraulically actuable, and by parking brake the secondary vehicle braking system, usually mechanically actuable.

Wear adjusters are normally incorporated in drum brakes to maintain a substantially fixed clearance between the brake shoes and the brake drum to compensate for wear of the brake shoe linings.

Such adjusters are desirable as they maintain the working travel of the expanding means within the range of the vehicle brake actuating system. Automatic operation of wear adjusters as the brake is actuated is known.

This invention is particularly concerned with wear adjusters for drum brakes having a strut between a handbrake lever pivoted on one shoe, and the other shoe. Prior art adjuster mechanisms for such brakes have included screw-threaded members in the strut, the members being relatively rotatable on operation of the brake to lengthen the strut and so compensate for wear of the brake shoe linings. One problem with such adjuster mechanisms is that they increase the space required for the strut in a critical area between the brake actuating cylinder and the rotatable hub. This arrangement further requires that the screw threads of the members transmit braking actuating loads on operation of the handbrake.

The present invention provides a wear adjuster including wedging means between one end of the strut and the co-operating handbrake lever or brake shoe, the effect of the wedging means being varied by a screwing mechanism to compensate for wear in the brake shoe linings.

Present day commercial pressures and trading conditions dictate that every effort be made to achieve a functionally acceptable product at minimum cost. Careful consideration of the wear adjuster with which the invention is concerned has revealed that, for some brake installations, one spring can be utilised for two functions.

According to the invention there is provided a wear adjuster for maintaining a given maximum clearance in an internal shoe drum brake including a handbrake lever pivoted to one brake shoe, an undivided strut extending between the lever and the other brake shoe and pull-off spring means effective between the brake shoes, said adjuster including a spacer to co-act with the strut, a screwing mechanism to vary the spacing effect of the spacer on the strut and an actuating mechanism responsive to service operation of the brake and including biassing means to operate the screwing mechanism when the given maximum clearance is exceeded, the said pull-off spring means being anchored to the actuating mechanism so as to serve also as the biassing means.

Other features of the invention are included in the following description of a preferred embodiment shown, by way of example only, in the accompanying drawing in which:

FIG. 1 is a view on a drum brake assembly to which the invention is applicable;

FIG. 2 is a view on a brake shoe of the drum brake assembly and showing the adjuster mechanism of the invention;

FIG. 3 is a part sectional view on line A—A of FIG. 2;

FIG. 4 is a part sectional view on line B—B of FIG. 2; and

FIG. 5 shows a perspective assembly view of the nut of the screwing mechanism illustrating the ratchet teeth and the alternative D section spacer.

With reference to FIG. 1 there is shown a drum brake assembly having a pair of brake shoes 11, 12 mounted on a backplate 13 and urged apart, by service brake expander means 14, about a fixed abutment 15, pull-off springs (not shown) are provided to return the brake shoes to the inoperative position. A handbrake lever 16 is pivoted to the brake shoe 12 and acts on the shoe 11 through a cross-strut 17, movement of the lever clockwise (as viewed) about it pivot urging the shoes 11, 12 apart to apply the brake.

With reference to FIGS. 2-4 brake shoe 11 carries an adjuster mechanism 21. The mechanism has a base plate 22 secured to the brake shoe web 23 by pin means comprising a shouldered rivet 24. A tongue 25 pressed out of the plate 22 is located in an aperture 26 of the web 23 to retain the base plate against rotation.

A screwing mechanism comprises a nut 27, having peripheral ratchet teeth, and bolt 28 which extends from and forms part of a wedge member 29. The nut has a part-spherical face which is located against and supported by a co-operating flange 31 of the base plate 22.

The wedge member 29 is located between the strut 17 and abutment means comprising a large diameter shoulder 32 of the rivet 24. The base plate 22 supports the member 29 for relative pivotal and sliding movement.

A pecker 33 is pivotally mounted on the rivet 24 and comprises a relatively rigid plate 34 and a relatively resilient actuating arm 35. The plate 34 includes a projection 36, which engages the wedge member 29 at point below the line of load transmission of the strut 17 (as viewsd), and an aperture 37 in which is located one end of a brake shoe pull-off spring 38.

The arm 35 carries a tooth 39 which engages the ratchet teeth of the nut 27, as shown in FIG. 5.

Operation of the adjuster is as follows:

. In the brake-released condition the strut 17 maintains the shoes 11, 12 apart against the effect of the pull-off spring 38. The load from the spring is passed to the brake shoe 11 through the rivet 24 and to the wedge member 29 through the projection 36. The member 29 is supported by the rivet shoulder 32 and through the bolt 28 and flange 31 by the tongue 25 to react the transmitted load of the strut 17.

Actuation of the service brake expander urges the brake shoes 11, 12 apart and releases the strut 17 from compressive load between the shoes. Pull-off spring 38 maintains the projection 36 in contact with the wedge member 29 as the brake shoe 11 pivots about the abutment 15. The shoulder 32 moves with the brake shoe 11 away from the wedge member 29 and the pecker 33 consequently pivots relatively anti-clockwise, as viewed, about the rivet 24.

The part-spherical face of the nut 27 allows the screwing mechanism to tilt relatively to the base plate 22 as the brake shoe 11 moves relatively to the wedge member 29.

The relative movement of the pecker causes the actuating arm 35 to nudge the adjacent ratchet tooth of the nut and so rotate the nut relatively to the bolt 28. The effective length of the screwing mechanism is thus increased and the wedge member 29 driven relatively to the strut 17 to increase the effective length of the strut and so maintain the brake shoes further spaced apart on release of the expander mechanism 14. The nut 27 is held against back wards rotation by friction in the screwing mechanism and friction between the mechanism and the flange 31. Since the actuating arm 35 is made of resilient material, such as spring steel, it can ride back up the ramp of the next following ratchet tooth.

As the brake shoe linings wear the screwing mechanism is actuated to increase the effective length of the strut 17 and maintain a given maximum brake drum clearance.

A given minimum brake drum clearance is necessary to obviate dragging of the brake shoes against the brake drum. The stroke of the pecker 33, when related to the distance travelled across one tooth of the nut 27, will represent the shoe centre travel to operate the brake, plus an allowance for drum expansion due to temperature increase on braking, plus a minimum running clearance.

In a modification, as shown in FIG. 5, the part-spherical face of the nut 27 is replaced by a substantially D section spacer, the nut having a co-operating plain face. Tilting of the screwing mechanism relative to the base plate 22 is thus restricted to a plane substantially parallel to the plane of the brake back plate.

For replacement of worn adjuster parts in service it is intended that the shouldered rivet 24 could be replaced by a pivot post having known retention means, for example, a circlip co-operating with a groove of the post or a screw-threaded post and nut, to retain the adjuster to the back plate.

I claim:

1. A wear adjuster for maintaining a given maximum clearance in an internal shoe drum brake having:
    a backplate;
    service brake actuating means and an abutment mounted on the backplate;
    two brake shoes mounted on the backplate between the service brake actuating means and the abutment;
    a handbrake lever pivoted to one brake shoe;
    pin means including abutment means on the other brake shoe;
    an undivided strut extending between the handbrake lever and the other brake shoe;
    and pull-off spring means effective between the brake shoes;
    the wear adjuster comprising:
    a base plate to locate on said other brake shoe by said pin means and by a tongue for location in an aperture in said other brake shoe;
    a wedge member mounted on the base plate to co-act with the strut and said abutment means, the wedge member spacing the strut and said abutment means;
    a bolt extending from the forming part of the wedge member, the wedge member being supported for pivotal and sliding movement of the base plate;
    a nut on the bolt, the nut being supported so that rotation of the nut on the bolt moves the bolt and the wedge member to vary the spacing of said abutment means and the strut;
    peripheral ratchet teeth on the nut;
    a pecker pivotal on said pin means and including a projection for engagement with the wedge member and a tooth for engagement with said ratchet teeth, said pull-off spring means being anchored to the pecker to serve also as biasing means to bias said projection into engagement with the wedge member.

2. The wear adjuster of claim 1, wherein said abutment means is a shoulder on said pin means.

* * * * *